(12) United States Patent
Chadwick et al.

(10) Patent No.: US 7,035,124 B2
(45) Date of Patent: **\*Apr. 25, 2006**

(54) DAMPING SYSTEM

(75) Inventors: David Chadwick, New Milton (GB); Martyn R. Harris, Winchester (GB); John A. Lyons, Southampton (GB); Jeremy Mortimer, Winchester (GB)

(73) Assignee: Bowman Power Group Ltd., Southampton (GB)

( * ) Notice: Subject to any disclaimer, the term of this patent is extended or adjusted under 35 U.S.C. 154(b) by 250 days.

This patent is subject to a terminal disclaimer.

(21) Appl. No.: 10/433,879

(22) PCT Filed: Dec. 29, 2000

(86) PCT No.: PCT/GB00/05003

§ 371 (c)(1),
(2), (4) Date: Oct. 30, 2003

(87) PCT Pub. No.: WO02/052709

PCT Pub. Date: Jul. 4, 2002

(65) Prior Publication Data

US 2004/0080966 A1    Apr. 29, 2004

(30) Foreign Application Priority Data

Dec. 22, 2000   (WO) .................. PCT/GB00/04973

(51) Int. Cl.
*H02M 1/12* (2006.01)

(52) U.S. Cl. ................ 363/40; 363/95; 322/25
(58) Field of Classification Search ............ 363/40, 363/41, 47, 95, 131, 132, 136; 322/17, 20, 322/25, 37; 290/40 C See application file for complete search history.

(56) References Cited

U.S. PATENT DOCUMENTS

| | | | |
|---|---|---|---|
| 4,692,855 A | 9/1987 | Kuroiwa et al. | 363/95 |
| 5,128,853 A | 7/1992 | Heinle | 363/41 |
| 5,381,328 A * | 1/1995 | Umezawa et al. | 363/95 |
| 5,666,255 A | 9/1997 | Muelleman | 361/111 |
| 5,734,249 A | 3/1998 | Pohjalainen et al. | 318/798 |
| 5,892,675 A * | 4/1999 | Yatsu et al. | 363/136 |

FOREIGN PATENT DOCUMENTS

| | | |
|---|---|---|
| EP | 0358191 | 3/1990 |
| EP | 0595319 | 5/1994 |
| JP | 05244702 | 9/1993 |

\* cited by examiner

*Primary Examiner*—Jessica Han
(74) *Attorney, Agent, or Firm*—Price, Heneveld, Cooper, DeWitt & Litton LLP (57) ABSTRACT

An active damping arrangement for a power conditioning circuit comprising a converter or an inverter and an electronically driven output line having an output terminal for connecting to an external load, the active damping arrangement comprising an inductor-capacitor low-pass output filter (OPF) for connecting between an output of the inverter/converter (PWMVC or BBHCC) and the output terminal; means for sensing current in or voltage across the capacitor or voltage between one end of the capacitor (C) and an effective neutral point; means for multiplying the sensed voltage or current by a coefficient G to provide a damping signal, and means for feeding back the damping signal to an input of the inverter/converter (PWMVC or BBHCC), thereby to damp the output of the inverter/converter.

16 Claims, 5 Drawing Sheets

Figure 1

Figure 2 - Voltage drive

Figure 3 - Active Damping for Voltage Drive

Figure 4 - Current Drive

Figure 5 - Active Damping for Current Drive

DAMPING SYSTEM

CROSS REFERENCE TO RELATED APPLICATIONS

This application is the National Stage of International Application No. PCT/GB00/05003, filed on Dec. 29, 2000, which is a continuation-in-part of and claims priority on International Application No. PCT/GB00/04973, filed on Dec. 22, 2000.

The invention relates to an active damping arrangement for electronic power conditioning units.

Power conditioning units contain inverters or converters and are used to supply AC or DC power either as voltage-drives into a load or as current-drives for example in the AC case into a power distribution network. Most power conditioning units operate in switched-mode and contain output filters on one or more output lines. The purpose of the output filters is to reduce high-frequency components of voltage and/or current at the output terminals produced by the switching action. There are problems associated with such filters, essentially due to lightly damped resonance effects caused by interaction of inductance and capacitance.

Inverters/converters that operate at substantial power ratings are generally required to maintain good efficiency, and are frequently required also to offer good output waveform quality. In this context, it will be understood that the term 'waveform' embraces either periodic AC or continuous DC output. These requirements mean that the inverters/converters operate in a switched mode in order to minimize internal losses and have many switching operations per second so as to permit detailed control of the output waveform. A well-known example of a switched-mode technique for shaping the output waveform is pulse-width modulation (PWM), which typically works with IGBTs as the switched output devices and employs modulating frequencies up to about 15 kHz. The switching frequency is sometimes fixed and sometimes caused to vary with time, as it may for example throughout the cycle of an AC waveform. To achieve high waveform quality it is necessary to include an output filter in each electronically driven output line to remove the majority of the high-frequency ripple harmonics in the output voltage and/or current waveform that are associated with the switching action.

A typical output filter for one line comprises a series inductor L1 that is connected to the appropriate output point of the inverter/converter, followed by a parallel capacitor C, the return end of the capacitor being connected either to a neutral point or to one or both rails of a DC link. In the case of the DC link, it should be noted that this is electrically a return path equivalent to the neutral for the ripple harmonics. In addition, for the DC link, the total capacitance may be split in two and half returned to each rail. The combination of L1 and C constitutes a second-order low-pass filter, with an undamped resonance at frequency:

$$f1o = 1/((2\pi)(L1\,C)^{1/2}).$$

Alternatively, the capacitors may be connected between pairs of output lines, which produces an effect as though there were an equivalent value of C connected as described above. The equivalence is however not exact in all respects, particularly in regard to common-mode components of ripple waveforms, but sufficiently similar to constitute in practice an acceptable alternative manner of connection for some applications.

The effect of the output filter is to limit the magnitudes of various high-frequency harmonics of current generated by the switching action of the inverter/converter. Additionally, the filter reduces to a low level the magnitude of the corresponding high-frequency harmonics of voltage occurring across C, at the output end of L1. The output terminal to an external load may be the common point of L1 and C. Alternatively, there may be interposed a further series inductor L2 following C. The primary purpose of this is to ensure that the majority of the high-frequency current that flows through L1 is forced to flow through C. Otherwise, a substantial proportion of this high-frequency current could flow into the external load, if L2 is absent and if the inductance of the load is low. It should be noted that there may also be further impedance interposed between the output of the inverter/converter and the output terminal to the load, an example being an EMC filter. It is possible for such a filter to serve a dual function, in particular to provide all or a part of the required value of L2 for the purpose described. The inductor L1, and/or L2, may be a separate inductor for each output line that contains an output filter or there may be a multi-winding combined inductor that provides from a single structure the required inductance per line for all or some of the lines. The design of output filters of the type described is generally well understood.

It is well-known that if the output power is to be supplied into a load, then the output voltage of the power conditioning unit normally needs to be 'stiff'. This means that the voltage waveform needs to have a magnitude that is either constant or controlled so as to vary slightly in a required manner with load (giving a 'voltage regulation' characteristic). In addition, the shape of the waveform needs to remain close to a demanded shape (usually sinusoidal) under all load conditions. In this case the current drawn is determined by the load, both in magnitude and shape of waveform, and so the current characteristic is 'soft'. Such a power conditioning unit may be described as a 'voltage-drive'. If the power is to be supplied for example into a power distribution network, then it is usually the output current of the power conditioning unit that needs to be stiff. In this case, the output voltage adapts readily to the magnitude and shape of the voltage waveform that is applied by for example a distribution network to the output terminals of the power conditioning unit. Hence, the voltage characteristic of the power conditioning unit needs to be soft. Such a power conditioning unit may be described as a 'current-drive'.

By way of example, the design may be considered for an output filter for a power conditioning unit that contains a three-phase sine-wave AC voltage-drive inverter, operating at a basic frequency of 50 Hz, with a PWM frequency of 5 kHz and a signal sampling frequency of at least 5 kHz. It is convenient to place the resonant frequency of L1 and C at roughly 500 Hz, one decade above the basic frequency, so that the filter's attenuating effect at basic frequency is small. The reactance of L1 at 50 Hz may be set at approximately 0.05 per-unit (the unit of reactance in the per-unit system being equal, in accordance with the usual definition, to the quotient of rated phase voltage÷rated phase current). It then follows that the reactance of C will be 5.0 per-unit at the basic frequency. In accordance with the foregoing, rated phase current passing through L1 will cause a voltage drop across it of magnitude equal to 5% of rated voltage. This represents an acceptably small proportion of the maximum voltage available without distortion from the inverter, which is limited by the rail voltage of the DC link. Also a simple overall feedback control loop may readily correct for the relatively small variations in output voltage magnitude at basic frequency caused by the voltage drop across L1. At the same time, the large high-frequency harmonics that are contained in the voltage waveform produced directly at the output of the switching limbs of the inverter, due to PWM switching action, are reduced to roughly 1% of their magnitude at the centre-point of L1 and C. This is done by the action of this second-order filter. A sufficient value for the reactance of L2 at 50 Hz is generally about 0.005 per-unit. All the numerical values in the foregoing description are order-of-magnitude only, and may be varied considerably without altering basic principles.

Figure 1:
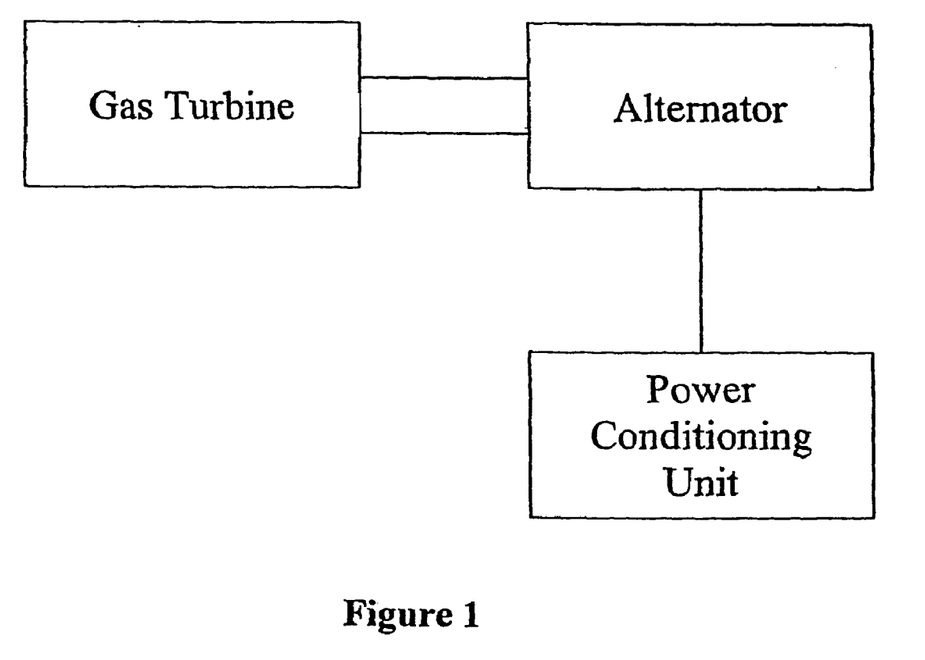
FIG. 1 is a block diagram of an electrical generator.

Power conditioning units are used in electrical generators to accept electrical power in whatever form it is made available from a preceding stage and to provide output electrical power in a form suited to the application. FIG. 1 shows an example of an electrical generator that comprises a prime mover in the form of a gas turbine, mechanically coupled to a permanent-magnet poly-phase alternator. Electrically connected to the alternator is a power conditioning unit for converting the output voltages at the terminals of the alternator to the voltage waveforms required at the output of the generator. The power conditioning unit comprises a rectifier that takes the alternator voltages as input and produces a DC link voltage as output. Connected to the output of the rectifier is a PWM inverter that takes the DC link voltage as input and produces at its output three-phase voltages. These typically contain a large content of high-frequency ripple associated with the PWM action. Connected to the output of the PWM inverter is a three-phase series-inductance/parallel-capacitance (L-C) output filter that removes the majority of the high-frequency ripple.

The electrical generator of FIG. 1 is commonly referred to as a 'micro-turbine-generator', MTG, which is able to provide a relatively small amount of power typically from a few kW to a few MW. An advantage of micro-turbine-generators is that instead of having a few generators of very large power rating at fixed locations and transmitting power over large distances for distribution to consumers, the power is generated in a multiplicity of generators of smaller power rating which are spread locally among consumers. These generators may operate to provide power to local loads or to a multiplicity of points in a distribution network or to a parallel combination of local loads and a distribution network. It should be noted that the output characteristic of the generator inverter in this last case is typically current-drive when there is connection to the distribution network, changing rapidly to voltage-drive if this connection is lost.

There are two particular problems with inductor/capacitor filters of the type described, both associated with the fact that there is little inherent damping of resonance effects caused by the interaction of inductance and capacitance. The first problem is that, although they reduce high-frequency ripple harmonics associated with PWM action in the output voltage waveform, such filters also act to increase output voltage harmonics at or close to the resonant frequency. These harmonics may have their origin in small voltage harmonics produced within the inverter/converter, or in small harmonics of output current drawn by the load, as may typically be caused by non-linearity of the load impedance. In addition, in certain operating conditions sudden changes of load (as at starting or switching load in or out), can produce a slowly decaying transient envelope on the output waveform, ringing at the resonant filter frequency.

Another problem caused by the action of the lightly damped filter is particularly relevant if overall control of the output voltage is achieved by the method of cyclic feedback. In accordance with this method, unwanted distortion in an output AC waveform is reduced, so causing it to follow closely a required waveform, by progressively over a number of cycles building up a demand waveform that differs from the required waveform in such a way that the output waveform is caused to better approximate to the required waveform. It may be shown to be advantageous for the operation of such a control system if the complete feedback loop can be designed so that the total sum of phase-lags around the loop is made to increase as nearly as possible proportionately to the frequency, over as large a part as possible of the frequency spectrum extending up to close to the basic switching frequency of the switched-mode operation. The virtue of such a phase-lag characteristic is that it can be substantially compensated by a simple time-advance of the signal fed back. However a lightly damped L-C filter causes a phase lag of the output signal of the filter relative to the input signal that varies from zero to 180° lag in a very narrow frequency band. That departs substantially from the desirable near-proportionality of phase lag to frequency, and the effect on the cyclic feedback system is to cause it to be close to an unstable operating condition. It may be noted that the rapid and substantial variation of phase caused by a lightly damped resonance is likely also to produce problems for the design of overall feedback arrangements alternative to cyclic feedback, such for example as a classical linear control system.

Instead of damping the filter, it is in principle possible to compensate the phase-frequency characteristic of an undamped resonant circuit by the addition of a suitable designed phase-compensator, but this needs to be accurately tuned and in practice the required tuning may vary with load due to saturation effects in the inductor. Moreover this alternative approach does not assist the first problem with lightly damped filters, discussed above.

The problems associated with output filters have been described as for a voltage-drive producing an AC output waveform and employing a PWM switching strategy to shape that waveform. Similar problems exist for a current-drive and for switching strategies other than PWM. However, in a current-drive the troublesome resonance is found to occur between L2tot and C (where L2tot=the inductance of the internal inductor L2 plus external inductance associated with the connected load), rather than L1 and C. If the output is in the form of DC rather than AC, there is similarly a need for one or more output filters to reduce high-frequency ripple associated with the switched mode of operation, and the invention is basically applicable to this case.

Harmonics in the output waveforms that are not reduced to a negligible level at the output of the filter, by the action of the filter, must be reduced by other means, typically in the form of a control system embodying an overall feedback loop around the power conditioning unit. Such a control system typically also controls the magnitudes of the wanted output waveforms. Cyclic feedback is one such control system. In principle, harmonics that are allowed by the action of the filter to remain unduly large, may be reduced by action of the overall control system. However in practice it may be difficult to design the system so as to provide sufficient attenuating effect on the unwanted harmonics without running into problems of instability, and it is therefore highly desirable to minimize the harmonics at source.

The effects of the problems described above may be reduced by introducing means for damping resonance of the output filter. This can be done by adding one or more passive resistors to the filter circuit. However, in practice this is found unavoidably to cause a high level of power loss in the resistors, which constitutes a problem with overheating for the resistors and an unacceptable reduction in overall efficiency.

An object of the invention is to overcome the problems associated with the arrangements described above.

Various aspects of the present invention are defined in the independent claims. Some preferred features are defined in the dependent claims.

According to the present invention there is provided an active damping arrangement comprising means to apply feedback to a power conditioning unit that includes an inverter or converter operating in switched mode, and in which there are one or more electronically driven output lines that have an inductor-capacitor low-pass output filter interposed between the output point of the inverter/converter for that line and the output terminal that is connected to an external load. The purpose of the feedback is to provide damping of resonance effects between inductance and capacitance which can be caused by the presence of the output filter. A primary purpose of the output filter is to attenuate high-frequency components of voltage and current that are generated at the output of the inverter/converter as a consequence of its switching action. The filter is of such a nature as to effectively comprise, starting from the inverter/converter end of the filter, a series inductor L1, followed by a parallel capacitor C and optionally a further series inductor L2. There may additionally be further filter elements, such as an EMC filter, that serve other purposes but contribute to the total effective values of L1 or L2 or C. For each output line to which the invention is applied, either current in a capacitor or voltage across a capacitor (depending on the character of the inverter/converter and the corresponding type of damping required) is sensed. The sensed signal is multiplied by a coefficient G and fed back with negative sign to a summing-junction at the input to the inverter/converter.

For each output line to which the invention is applied the return path for the parallel capacitor C may be to a neutral point. Alternatively, the total capacitance of C may be split so as to have return paths distributed among two or more neutral points. Alternatively, the return path may be to a rail of a DC supply, or the total capacitance of C may be split so as to have return paths distributed among two or more rails. Alternatively some or all of the capacitance of the capacitors may be connected between the output lines rather than being returned in a path or paths as described. In this case, the manner of connection between lines is such that the capacitors function substantially in the same way that alternative capacitors of suitably chosen values would function if returned in paths as described. However, in respect of common-mode components of ripple voltages on the lines their function is permissibly not equivalent. The inductors L1 and L2 may be individual inductors for each output line, or there may be one or more multi-winding combined inductors which effectively serve the purpose of providing values of L1 and/or L2 for more than one and possibly all of the output lines.

The invention comprises means to provide, for a filter consisting of L1 and C as described plus the further inductor L2 when appropriate, an electronic feedback loop around the filter and inverter/converter. This feedback loop is so arranged as to produce a damping effect on filter resonance which may be referred to as active damping. In important respects the effect is as though a resistor were present in association with the filter circuit (though this is not in all cases a precisely correct physical picture), which is however a virtual resistor rather than a real, passive resistor. Consequently the power loss that would occur in this resistor if it were of the passive type, becomes a virtual power loss that results in no significant dissipation of energy or heating effect. The exact manner of the feedback and the effective placement of the virtual resistor are different according to whether the power conditioning unit is a voltage-drive or a current-drive.

The feedback to provide active damping may be achieved by digital or analog means. However if digital feedback is employed, in conjunction with digital control of the PWM process, it is found that consequent time delays around the feedback loop easily begin to degrade performance. It is necessary to minimize such time delays and study of system performance by computer modeling during the design process is advisable to ensure that undesirable effects are controlled at an acceptable level.

Previous discussion has concerned the invention as it would be applied, for example, to each of the output lines of a poly-phase power conditioning unit, to reduce distortion effects due to resonance on those lines. The invention may equally be applied for the same purpose to a neutral line. This may be done if that neutral is provided by the power conditioning unit in the form of an active line whose voltage is controlled electronically and which embodies an output filter of essentially the same form as the poly-phase output lines. The arrangements for signal sensing and feedback are generally the same as those for a poly-phase output line.

The invention as described acts, in control system terms, as an inner loop that can be readily combined with an outer loop and/or with other control signals to provide further control functions. An example of such an outer loop is cyclic feedback, which combines with active damping in a power conditioning unit without difficulty. As an alternative to cyclic feedback, or possibly in addition, a conventional linear overall control loop may be added, or alternatively some form of non-linear control loop, and with all of these possibilities the control loop may further be made adaptive in form. Active damping is generally compatible with all these variations, and a skilled person will be able to design an arrangement to combine the damping and other control functions without difficulty.

The technique of third-harmonic injection is also well-known, whereby for three-phase output a larger output voltage may be obtained from a given DC link voltage without gross distortion of the output waveform occurring due to clipping of the voltage signal against the limits of the DC rail voltages. Application of third-harmonic injection to a voltage-drive in combination with the invention as described is similarly straightforward, involving simply the addition of a third-harmonic signal waveform of appropriate magnitude and phase to one or more input summing-junctions for the three-phase output lines and/or for an electronically driven neutral line, according to the application, as described in more detail later.

The inverter/converter may be of voltage-drive form so that a voltage signal at an input point of the inverter/converter produces a corresponding voltage at output. According to the invention for a voltage-drive the feedback is arranged as follows. The current in the capacitor C is sensed, multiplied by a coefficient G and fed back to a summing-junction at the input to the inverter/converter so as to be added with negative sign to the demand signal waveform that drives the total input to the inverter/converter. This results in the output voltage waveform from the inverter/converter. Any scale factor that may exist around the feedback loop, for example between the magnitude of voltage signal at input and corresponding voltage at output of the inverter/converter, is disregarded in this discussion, it being assumed that if such scaling exists then the signal fed back would be scaled in accordance.

The effect of the feedback can be expressed by an equation for behavior at a general frequency f, in which Vi is the input voltage to the inverter/converter but not including the feedback signal for active damping, Vo is the total output voltage from the filter, and Io is the total output current drawn from the filter into an external load. The presence or otherwise of L2 is neglected as being not important for the equation that follows. Coefficient G has the units of resistance and is replaced accordingly by the symbol Rf, XL1 is the reactance of L1 and XC is the reactance of C, both at frequency f. It may be shown that:

$$Vo=Vi\,((-jXC)/(Rf+jXL1-jXC))-Io((-jXC)jXL1/(Rf+jXL1-jXC)) \quad (1)$$

A suitable value of Rf is such as to achieve very roughly critical damping; in other words, Rf is of the same order as XL1 or XC at the undamped L1-C resonant frequency, these two values being equal. Consideration of this equation readily shows that when the harmonic frequency f is much less or much more than the resonant frequency f1o of L1 and C, then the presence of the term Rf due to feedback has negligible effect. But when f equals or is close to f1o, the presence of Rf is critical. With Rf=0, a small input voltage would produce a large output voltage. This is due to the denominator of the first term of the Equation. If the load draws a small output current at that frequency then correspondingly a large voltage would again appear in the output, due to the denominator of the second term. In practice, the small input voltage may arise, not at the input summing-junction as represented above, but due to small distortion effects within the inverter/converter, and the small harmonics of output current may typically be drawn by the load, due to the load impedance being markedly non-linear.

This result clearly implies that large distortions of output voltage waveform result, due to resonance interacting either with small values of harmonic input voltage distortion or small values of harmonic output current distortion. However, in the presence of active damping, when Rf≠0, these large distortion effects are suppressed. So far as the denominators of the two terms in Equation (1) are concerned, it can be seen there is a virtual resistor of value Rf effectively positioned in series with either L1 or C, which effectively damps resonance effects between L1 and C. It should be noted, however, that this physical analogy is not exact, because Rf does not occur in the numerators of Equation (1), either in association with L1 or C.

Equation (1) shows that damping is achieved without the disadvantage of a very large power loss that there would necessarily be in a real, passive damping resistor, but the arrangement is actually superior to a real resistor in another important respect. Wherever a real resistor is placed, it seriously degrades the performance of the power conditioning unit in one way or another: in series with L1, it increases the voltage drop through the filter at the basic AC frequency; in parallel with L1 or in series with C it reduces the effectiveness of the filter in attenuating high-frequency ripple voltages associated with the switching action; in parallel with C it increases the current at basic AC frequency that is drawn by the filter in parallel with the output current to the external load. All these difficulties are avoided by the active damping circuit.

Further analysis shows that the phase change from input to output of the filter varies much more slowly as a function of frequency, as the frequency varies from well below to well above the resonant frequency. This effect, which is to be expected in an L-C circuit that is well damped, is precisely what is required in order to make the filter compatible with good performance in a cyclic feedback control system.

The inverter/converter may be of a current-drive form so that a voltage signal proportional to a current applied at an input point of the inverter/converter produces a corresponding current at output. For each output line feedback is applied to produce active damping in which voltage is sensed across a capacitor of the output filter. The sensed signal is multiplied by a coefficient, passed through a high-pass filter (preferably though not necessarily second-order) and effectively added with negative sign to the input of the inverter/converter.

The application to a current-drive calls for a slightly different arrangement than for that to a voltage-drive, and is now described. The form of the filter is basically unchanged comprising L1, L2 and C as before. However the significant inductance for resonance effects is now the total output inductance, L2tot. It may be assumed that the inverter/converter for current-drive operates so as to force current IL1 through L1 when a signal equivalent to IL1 is applied to the input summing-junction of the inverter/converter. This action effectively suppresses any tendency to resonance between L1 and C, but there is now a resonance between L2tot and C, with resonant frequency:

$$f2o=1/((2\,\pi)(L2tot\,C)^{1/2})$$

This causes large distortions in the output current waveform for small driving effects, in a manner analogous to that with the voltage-drive.

The coefficient G may have a value of the same order as or rather less than the admittance of L2tot or C at the undamped L2tot-C resonant frequency, these two values being equal, calculated for the case where there is negligible external inductance so that L2tot=L2.

Additionally, it is found that the phase of the output current from the filter varies relative to the input current from zero electrical degrees at a frequency sufficiently below the resonant frequency up to 180° lag at a frequency sufficiently above. If the filter is only lightly damped, most of this 180° phase change occurs rapidly in a narrow frequency band, as before, and this again poses a problem for the stability of cyclic feedback.

For a current-drive the feedback is arranged as follows. The voltage (measured in volts) across the capacitor C is sensed, multiplied by a coefficient G (=Yf) and fed back to a summing-junction at the input to the inverter/converter. The multiplied signal is then added with negative sign to the demand signal waveform that drives the input to the inverter/converter and results in the output current waveform from the inverter/converter. As before, any scale factor that may exist around the feedback loop, for example between the magnitude of signal at input and corresponding current at output of the inverter/converter is disregarded in this discussion, it being assumed that the signal fed back is scaled in accordance with such scaling.

The effect of this feedback can be expressed by an equation for behavior at a general frequency f, in which Ii is the input current signal to the inverter/converter but not including the feedback signal for active damping, Io is the total output current from the filter, and Vo is the voltage applied to the output of the filter by an external load. The presence or otherwise of L1 is neglected since it is not important for the equation that follows. In this analysis it is assumed for simplicity of presentation that external inductance is negligible so that L2tot=L2; however it must be borne in mind that in practice, L2tot may be considerably larger than L2 and the resonant frequency considerably lower, in accordance with the Equation for f2o above. Coefficient G has the units of conductance and is replaced accordingly by the symbol Yf, YL2 is the admittance of L2 and YC is the admittance of C, both at frequency f. It may be shown that:

$$Io=Ii((-jYL2)/(Yf-jYL2+jYC))-Vo((-jYL2)(Yf+jYC)/(Yf-jYL2+jYC)) \quad (2)$$

A suitable value of Yf is such as to achieve roughly critical damping, but in practice may be rather less than that, as noted. The reason for possibly preferring the smaller value of Yf is to do with a difficulty for the application of the invention to current-drive, discussed below. Equation (2) is similar in form to Equation (1), with voltage and current interchanged, and resistance and reactance exchanged for conductance and admittance; however the equation forms are not identical, again as discussed below.

Consideration shows that when the harmonic frequency f is much more than the resonant frequency f2o, then the presence of the term Yf due to feedback has negligible effect. When f equals or is close to f2o, the presence of Yf is critical. With Yf=0, a small input current would produce a large output current (due to the denominator of the first term of Equation (2)), and if the load applies a small output voltage at that frequency then correspondingly a large current would again appear in the output (due to the denominator of the second term).

In the presence of active damping, with Yf≠0, the two undesirable effects caused by lightly damped resonance, of a large output current being caused by a small input current and/or a small output voltage, are suppressed. In practice, the small input current may arise, not at the input summing-junction as represented above, but due to small distortion effects within the inverter/converter, and the small harmonics of output voltage are typically applied by the load, the voltage characteristic of the load with current-drive generally being not perfectly sinusoidal.

In the denominators of the two terms in Equation (2), it can be seen that there is an effect equivalent to a virtual resistor of conductance value Yf effectively positioned in parallel with C. This effectively damps resonance effects between L2 (or in practice L2tot) and C, in a similar fashion to the damping that is seen in Equation (1). However in Equation (2) the virtual resistor is also represented in the numerator of the second term, so that the physical analogy is in this case exact, unlike Equation (1) where there is no virtual resistance effect represented in the numerator. This difference between Equations (1) and (2) causes a difficulty, because the second term of Equation (2) shows that at the basic AC operating frequency, the applied output voltage greatly affects the output current when Yf≠0. In contrast for a voltage-drive, Equation (1) shows that the output current drawn only marginally affects the output voltage when Rf≠0.

This feature of the application of the invention to the current-drive, as so far described, is undesirable and needs to be overcome. That can be achieved by inserting a simple second-order high-pass 'feedback filter' (HPF in FIG. 5) in the active-damping feedback loop. The corner frequency of the high-pass filter is set at a value intermediate between the basic AC operating frequency and the undamped resonant frequency represented by the greatest value of L2tot and C. In this way, the feedback continues to be effective in damping undesirable resonance effects close to the resonant frequency, and as with the voltage-drive, damping is of course achieved without significant power loss. The attenuating performance of the output filter at high frequency is unchanged, but the undesirable effect of Io being highly sensitive to Vo at basic AC frequency is now much reduced. An active damping feedback arrangement incorporating the feedback filter as described may continue to have good stability characteristics.

Introduction of active damping for the current-drive, as described, has the additional effect of preventing the rapid change of phase with frequency across the output filter, from just below to just above resonant frequency. This rapid change causes problems for the stability of a cyclic feedback control system, as previously discussed. However, the presence of the feedback filter does alter the phase-frequency characteristic of the combination of inverter/converter and output filter. Accordingly in designing the cyclic feedback loop it may be advantageous to model or measure the change to the phase-frequency characteristic of the whole loop and to design phase compensators for the loop accordingly, in order to achieve a near-linear relationship between phase-lag around the whole loop and frequency. Further consideration of this matter is given in a co-pending patent application.

It will be clear that the output current at basic frequency cannot be made highly independent of the voltage applied at the output terminals, even when the feedback filter is present, so that the performance of the power conditioning unit, as described, falls short of being a perfect current-drive. To achieve a current-drive of high quality, it is therefore convenient to introduce a further control system embodying an overall control loop. As is well known, the same is commonly done in order to achieve a voltage-drive of high quality, making the output voltage highly independent of the output current drawn (or alternatively dependent in a prescribed way). In both cases, such a further system may conveniently be a cyclic feedback system, as previously described, or other system that is capable of being designed to achieve satisfactory output control.

All preceding discussion has concerned applications assuming AC output. As previously noted, the invention is also applicable to DC voltage-drives and current-drives. Design considerations are not greatly different, and the main steps may be enumerated as follows. Firstly, the frequency of switching may be selected. Secondly, the corner frequency of the output filter, f1o, may be set, by selecting values for L1 and C (see earlier), sufficiently below the switching frequency (probably by one decade or rather more) to enable the output filter to achieve the required attenuation at output of the high-frequency ripple harmonics caused by switching. Thirdly, L2 if required may be selected (see earlier). Fourthly, a value of G may be selected (see earlier). Those are the main, essential steps for both voltage-drive and current-drive; the following further steps are for the current-drive. Fifthly, consider the greatest value of inductance that is to be encountered in the load impedance, estimate the highest value of L2tot and the corresponding lowest value of f2o, and design the feedback filter, placing its corner frequency sufficiently below f2o (say, as a guide to good practice, by a factor of at least 3) so that the required damping of resonance will be available with the most highly inductive load. Sixthly, check that it is acceptable that the inherent characteristics of the combination of inverter/converter and output filter (without the benefit of overall feedback from a further control system) only become reasonably close to current-drive in nature for rates of change of load current corresponding to a frequency that is sufficiently below the corner frequency of the feedback filter (say, again, by a factor of at least 3).

Various systems and methods in which the invention is embodied will now be described by way of example only and with reference to the accompanying drawings, of which.

Figure 2:
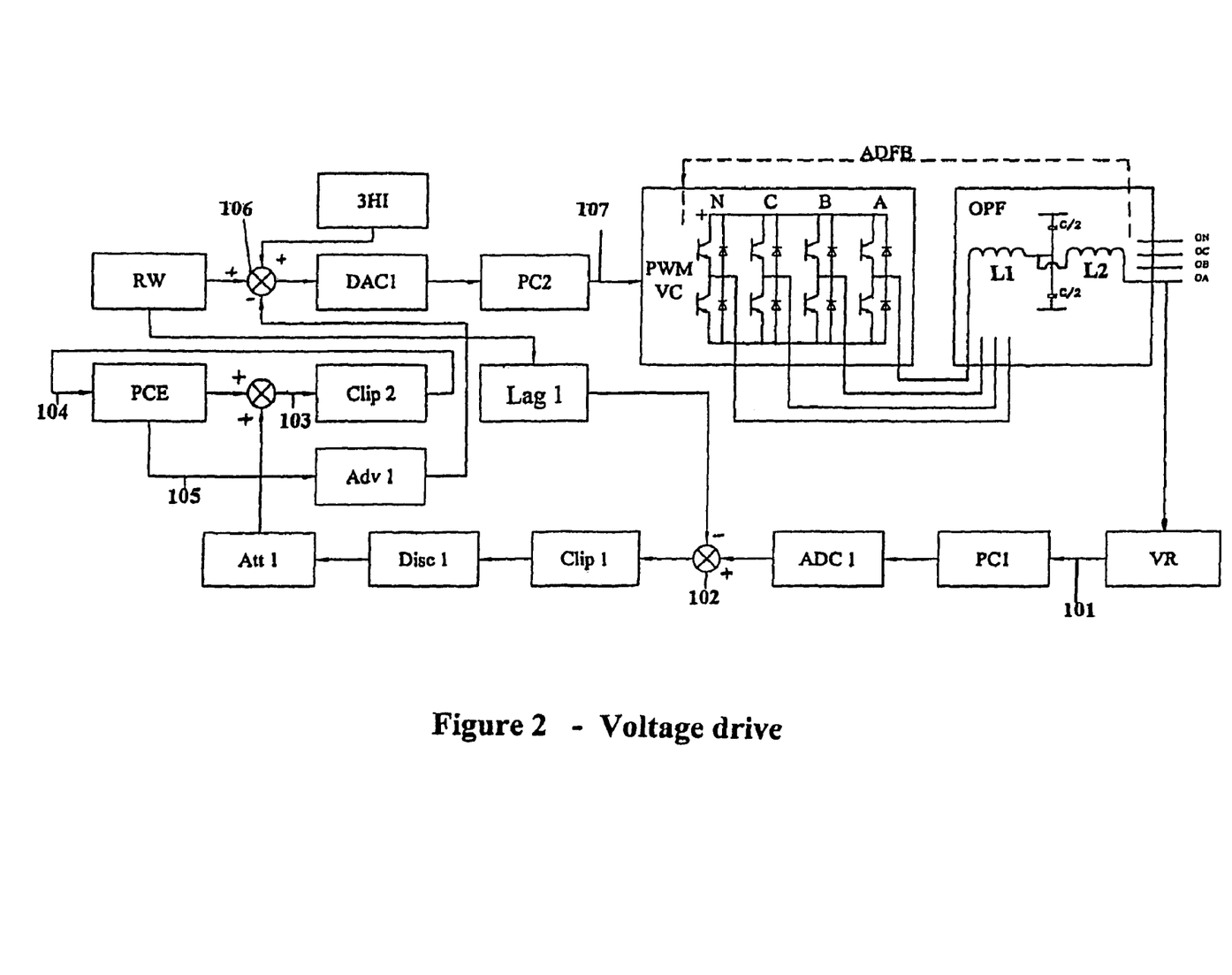
FIG. 2 is a block diagram of a form of voltage-drive.

FIG. 2 shows a power conditioning unit for a generator, which generator is, for example, rated at 120 A RMS line current, 277 V RMS maximum phase voltage and 50/60 Hz. The power conditioning unit includes a pulse-width-modulated voltage controller, PWMVC. Simple pulse-width modulation is employed with a modulating frequency of about 8 kHz.

Included in the controller is a four-limb output inverter, each limb connected between the rails of a DC link, which is preferably 900 V. One limb of the inverter is an active neutral N and the other three limbs constitute the three-phase output lines A, B, C. Each of the four inverter lines are connected to an output filter OPF. For simplicity, the filter for only one line is depicted in the diagram. Each line filter comprises a series inductor L1 plus two parallel capacitors, each C/2, that are connected between the two rails of the DC link. The main filtering action is provided by L1 and C. Connected in series with L1 is an inductor L2. This functions primarily as a blocking inductor for ensuring that the bulk of the ripple current is shunted through the capacitance. This prevents the ripple current from passing out through the generator output terminals OA, OB, OC, ON, into the external load, as may otherwise happen if the load has low or zero effective inductance. Suitable values for the components of the active filter are L1=350 micro-H, L2=30 micro-H, C=160 micro-F.

The voltage of each output line OA, OB, OC is sensed relative to the neutral line ON. The voltage of the neutral is sensed relative to the mid-point of the DC rails and the required waveform for this line is substantially zero. The cyclic feedback path for one line is shown in the diagram. It will be appreciated that like feedback paths are provided for each of the other lines. At the start of the cyclic feedback loop, the sensed voltage signal passes through a voltage reduction stage VR. The purpose of this stage is simply to scale the voltage signal to a safe level appropriate to the signal circuitry and not to attenuate the signal as part of the signal processing. The voltage signal then passes to a phase-compensator PC1 that is operable to alter the phase-frequency characteristic of the fed back signal so as to modify the variation of phase with frequency in selected ranges of frequency in a pre-determined manner. In its purpose and function, PC1 is similar to PC2, described later. However, because PC1 precedes various signal-processing stages compared with PC2, it may be found that a particular form of compensation is more conveniently or more effectively achieved in either PC1 or PC2, as the case may be. It should be noted that any appreciable phase shift through PC1 at the basic working frequency (in this example 50/60 Hz) may lead to fundamental inaccuracy in forming the error signal at a later stage in the feedback loop, and such phase shift must accordingly be avoided.

The compensated signal then passes through an analog-to-digital converter ADC1, which in a preferred embodiment is a 10-bit processor, sampling at 8 kHz. The output of ADC1 is fed to a summing-junction and differenced with the required signal waveform RW, which is fed down time-delayed as represented by the time-lag stage Lag1. The time-delay is set to correspond with the time-delay caused by ADC1, so that the two signals at the summing-junction are in correct time-relationship, both lagging in time relative to the output waveform. The magnitude of the lag is a matter of practical convenience and is corrected later in the loop as part of the function of Advl, which is adjusted heuristically to give optimum performance.

The output from the summing-junction is the sampled error signal waveform of the last cycle. This passes through a clipping stage Clip1, where the magnitude of any part of the waveform that exceeds a selected maximum limit is reduced in value to that limit, for example about 100 V. After this, the signal is passed to a discretisation sage Disc1 where it is modified so that the overall waveform magnitude is represented by a series of discrete values. The discretisation level, i.e. the magnitude of the change between each discrete value, is selected for optimum effect and is different from that occurring automatically in the signal sampling. As an example, the discretisation level may be set at about 5 V steps. As an alternative to discretisation, a process of discarding signal magnitudes below a threshold level of about 7 V may be used. In principle discarding is less effective in some respects, and more so in others, for reducing a tendency in one form or another to instability at higher frequencies; a heuristic process of trial-and-error is accordingly helpful in optimizing the design choice. Discarding has the advantage that it saves on processor requirement as compared with discretisation.

The discretised signal (or the signal that has been through the discard process) then passes to an attenuation stage Att1. At this stage, various options for attenuating the waveform magnitude are possible. For example, the waveform could be multiplied by a gain coefficient less than unity. Alternatively, a constant amount could be subtracted from the modulus of the signal at each point of the waveform and wherever the result of the subtraction is less than zero, the value of the signal could be set to zero. Alternatively, a zoned procedure could be used, in which different zones of the AC cycles are attenuated in accordance with differently defined algorithms, the zones being different regions of time in the AC cycle or different ranges of signal magnitude. As a preferred example in this application, attenuation is by multiplication and set at about times 0.3.

The attenuated signal waveform then passes to a summing-junction, at which it is added to a signal waveform store PCE, in which is stored the cumulative error waveform of previous cycles. The two sampled waveforms are summed, passed through a further clipping stage Clip2, preferably set at about 100V, and returned into the store PCE, ready to be used as the total cumulative error waveform in the next cycle.

The stored waveform PCE is read out in the next cycle, but advanced in time by a selected amount, as represented by the block Adv1. This processed total error waveform is differenced from the waveform read out from the required waveform store RW, this difference representing the demand waveform. At this stage, a drive signal waveform for third-harmonic injection, 3HI, is added. In a preferred embodiment, third harmonic injection is employed with the injected third-harmonic voltage set to about 15% of the rated phase voltage.

The output of the summing-junction passes through a digital-to-analog converter DAC1, the output of DAC1 being the analog drive signal, including third-harmonic injection, for the next cycle. This is then passed through a phase-compensator PC2, which is similar in purpose and function to PC1. The output of PC2 represents the total demand waveform, which is input to PWMVC as a revised demand signal. This process is continuously repeated so that the output waveform progressively converges towards the required waveform, despite the presence of various undesirable harmonic distorting effects.

It should be noted that the purpose of the compensators PC1 and PC2 is to improve the linearity of the phase-frequency characteristic of the main cyclic feedback loop. By phase-frequency characteristic is meant the characteristic of change of phase with frequency around the entire cyclic feedback loop, except that the time advance feature of Adv1 is neglected, of a signal at a general frequency f, where f takes all values within the range of frequency of interest. Since, according to the nature of cyclic feedback, the signal referred to forms an input in one cycle and an output in the next cycle of cyclic feedback, the relevant phase difference is that between output and input signals expressed on a common time-base represented by the required waveform at basic frequency. This phase-frequency characteristic may be simulated by computational modelling. Alternatively the phase-frequency, characteristic of the part of the circuit which contributes the most sizeable and complex effect may be measured. This may be done by cutting the feedback loop between DAC1 and PC2 and inputting a signal of frequency f to PC2, and likewise cutting the loop between ADC1 and PC1 and measuring the output signal from PC1.

It is desirable to maintain as far as possible a linear phase-frequency characteristic of the signal around the entire feedback loop within a pre-determined frequency range. In that circumstance, phase shift in the loop can be substantially compensated by the time shift function, as described previously, so as to give a small residual phase shift around the loop for a wide range of frequencies. Deviations of the phase-frequency characteristic from linear cannot be compensated by time shift and remain as residual phase deviations from zero after time shift compensation. To minimize the residual phase deviations, the phase-compensators PC1 and PC2 may be designed to compensate for departure of the total phase-frequency characteristic from linearity, which typically occurs in sub-ranges of frequency within the overall pre-determined range.

Both PC1 and PC2 are shown at stages in the feedback loop where the signal path is analog in form. They are typically constructed out of passive components and operational amplifiers. It will be appreciated, however, that PC1 and PC2 could equally be placed where the feedback path is digital and digital processing used. However, this has the disadvantage that the compensators PC1 and PC2 then add to the burden of signal processing in the loop and may introduce signal-distorting effects associated with digital filters.

Whilst the cyclic feedback system described above can be effective for causing the output waveform to converge towards a required waveform in a substantial range of operating conditions, the performance of the cyclic feedback system may be further improved by introducing active damping. In this arrangement, a, signal from the output filter OPF is fed back to an input of the inverter, which signal is proportional to the current in the capacitor C. The active damping arrangement of FIG. 2 is shown in more detail in FIG. 3. As before, the output filter for only one line is shown.

Figure 3:
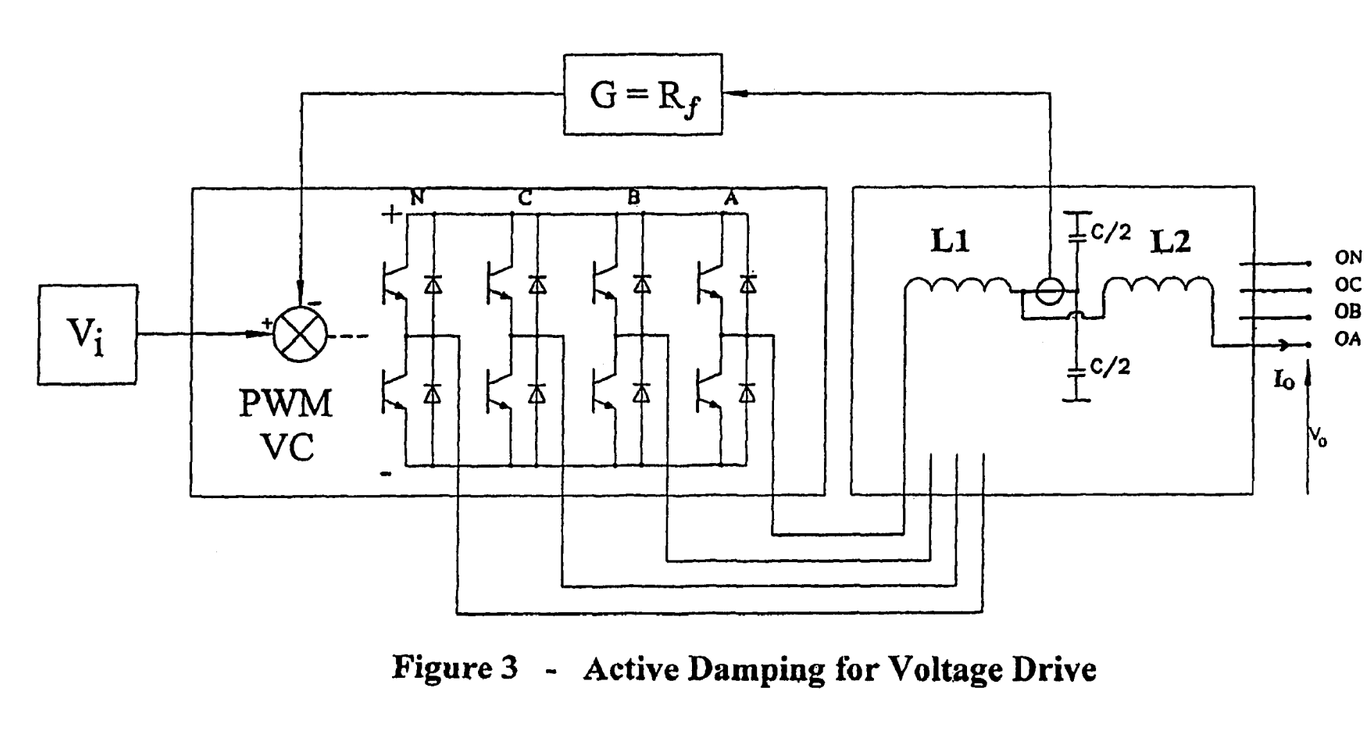
FIG. 3 is a block diagram of an active damping arrangement for the drive of FIG. 2.

FIG. 3 shows a sensor that is provided for sensing current in the capacitor C. The sensed current signal is adjusted in magnitude, equivalent in effect to multiplying the current value by a coefficient G, to provide a damping signal.

The value of G may vary within a range, according to the particular application. Typically, it may have a value that is substantially of the same order as the reactance of the total capacitance C or inductance L1 at their undamped resonant frequency (these values being equal). The damping signal, is fed back to a summing-junction at an input to the inverter, as shown in FIG. 3, this summing-junction being between PC2 and the input to the pulse-width modulation stage (not shown in detail) of PWMVC. In this way, the output of the combined inverter/converter and output filter is actively damped.

In the embodiment of the voltage-drive, as described, active damping is introduced with the feedback coefficient G (see FIG. 3) set to 1.5 ohms. This degree of active damping yields a phase-frequency characteristic for the filter, which in combination with all other contributory sources of phase-frequency effect around the loop yields a total characteristic for the loop that has acceptably low deviation from linearity. In practice, for this example, the deviation may be so low as to make it possible to omit the phase-compensators PC1 and/or PC2 from the cyclic feedback loop.

In use of the circuit of FIG. 2, there are two types of feedback—cyclic feedback and active damping. In the cyclic feedback loop, which is a slow loop acting cycle-by-cycle, the output waveform is sampled, stored and compared with a pre-determined required waveform, the difference between the output and the required waveforms representing an error waveform. The error waveform is processed by clipping, discretising and attenuating, to produce a processed error waveform. Once this is done, the processed error waveform is added to a cumulative sum of processed error waveforms, with further clipping at that addition stage. The new cumulative sum of processed waveforms is advanced in time relative to the output waveform and subtracted from the required waveform to produce a revised demand waveform for use in the next AC cycle.

In the active-damping loop, which is a fast-responding loop, current through the capacitor is multiplied by a coefficient-G and fed to an input of the inverter as described, producing an improved phase-frequency characteristic for the closed loop of the cyclic feedback arrangement. At the same time, the active damping also acts to reduce the uncorrected harmonic distortion at the output terminals of the power conditioning unit, by which is meant, the distortion that would be present in the absence of cyclic feedback. Thus the task of the cyclic feedback is eased, which tends further to improve the performance of the generator. In this way, using both types of feedback, the combination of qualities of level of harmonic distortion, settling time, and robustness of the output waveform purity and stability to changes in load condition, may be further improved over what is available using only cyclic feedback.

Using the specific arrangement of FIGS. 2 and 3, the generator output substantially settles in 2–3 cycles following a sudden disturbance. This is advantageous. The system has been shown to provide better than 3% THD into a wide range of linear and non-linear loads.

Figure 4:
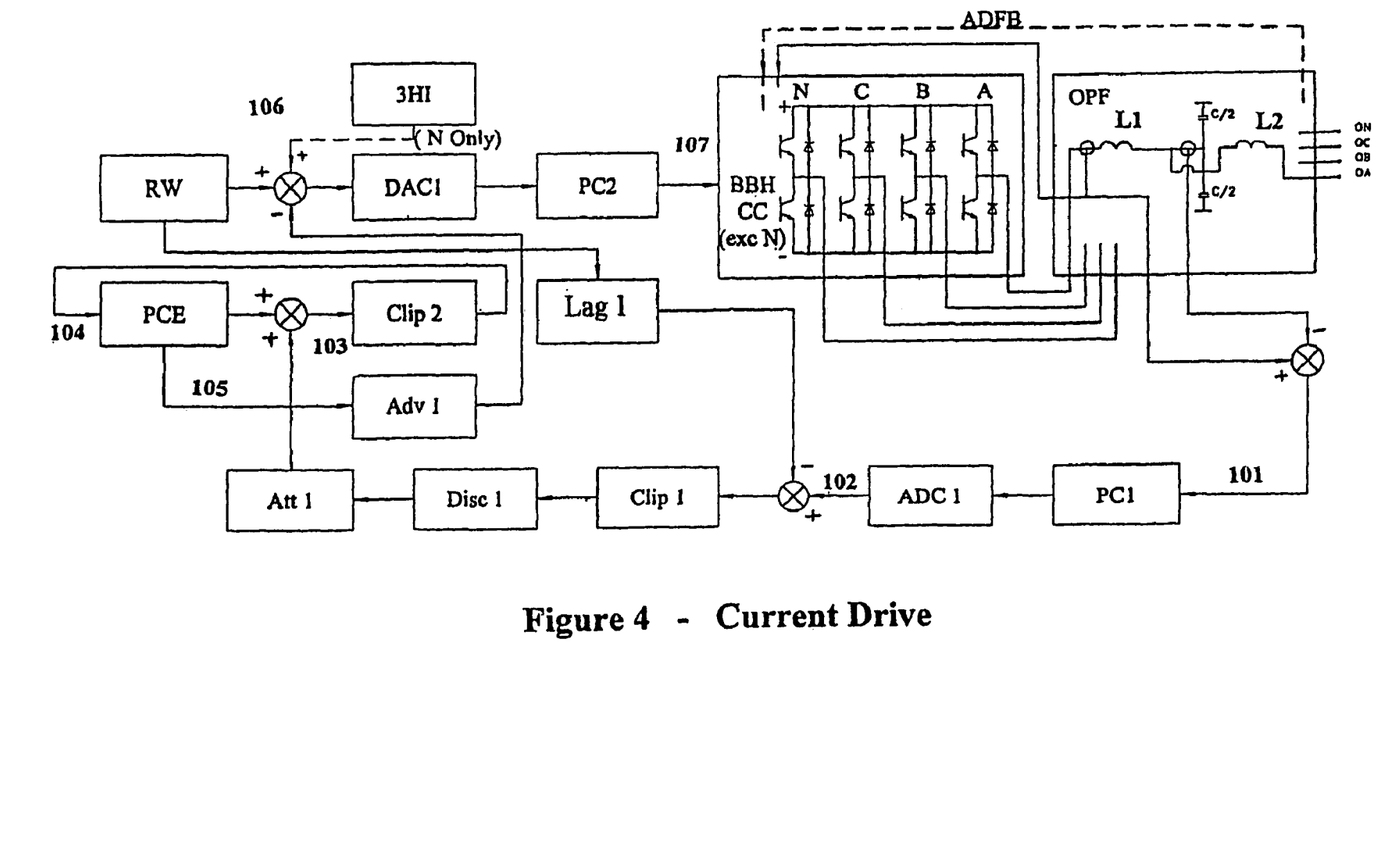
FIG. 4 is a block diagram of a form of current-drive.

FIG. 4 shows a power conditioning unit for a generator, which generator is, for example, rated at 120 A RMS line current, 277 V RMS maximum phase voltage and 50/60 Hz. As for the example shown in FIG. 2, the preferred DC link is 900V. In this case, however, the power conditioning unit is a current-drive, as opposed to a voltage-drive. Included in the power conditioning unit of FIG. 4 is a main inverter block, which is a bang-bang hysteresis-type current controller BBHCC for driving three output lines A,B,C, which BBHCC is preferably provided with a variable-width hysteresis-band feature. The aim of this is to keep the switching frequency roughly constant at around 8 kHz throughout the AC cycle; the band is set to vary from approximately 80 A near the zero crossovers of voltage to 40 A near the voltage peaks. Also provided is an active neutral limb N. The drive for the neutral N is a pulse-width modulated voltage controller drive PWMVC as previously described.

Connected to each of the lines in the controller is an output filter OPF, the form of which is the same as for FIG. 2. As before, for simplicity, the filter for only one line is depicted in the diagram. Again, an active damper may be incorporated around the filter and inverter, through the feedback path ADFB. For line N the nature of the active damper would be the same as that shown in FIG. 3. However, for lines A, B, C, the arrangement is slightly different. This will, be described later in more detail.

Considering the operation of the cyclic feedback, the current in each output line OA, OB, OC is sensed and the voltage of the neutral is sensed relative to the mid-point of the DC rails, the required waveform for the neutral line being zero. The feedback paths for one output line are shown in FIG. 4. Concentrating on the output lines OA, OB, OC, the current in L1 is fed back to the bang-bang controller, as shown, which accordingly exercises direct control on that current and not the output current in L2. However, the cyclic feedback loop acts to correct the situation by forming an error correction term in PCE, which alters the current controlled in L1 so as to make the current in L2 accord with the required current waveform, RW. The signal fed back in the outer cyclic feed-back loop is the current in L2, formed by differencing at a summation stage, the sensed currents in L1 and C.

More specifically, a sensor is provided for sensing the current passing through L1, the sensed current being added into a summing-junction with positive sign. Another sensor is provided for sensing the current passing through the capacitor C, the sensed current being added into the summing-junction with negative sign. The difference between the two sensed currents provides an indirect measure of the current in L2 at the output. The current waveform is then passed through a phase-compensator PC1, and an analog-to-digital converter ADC1, whose descriptions and functions are as previously given. The output of ADC1 is fed to a summing-junction and differenced with the required waveform signal RW, which is fed down time-delayed as represented by the time-lag stage Lag1. The time-delay is set to correspond with that caused by ADC1, as before, so that the two signals at the summing-junction are in correct relative time-phase, both lagging in time relative to the output waveform.

The output from the summing-junction is the sampled error signal waveform of the last cycle. This passes through a clipping stage Clip1, where the magnitude of any part of the waveform that exceeds a selected maximum limit is reduced in value to that limit, for example about 20 A. After this, the signal is passed to a discretisation stage Disc1 where it is modified so that the overall waveform magnitude is represented by a series of discrete values. As an example, the discretisation level may be set at about 1 A steps. As with the voltage-drive of FIG. 2, as an alternative to discretisation, a procedure of discarding signal magnitudes below a threshold level of a few amperes may be acceptable, the choice in this matter being influenced both by overall effectiveness in practice, and demand on processing power. The discretised signal (or the signal that has been through the discard process) then passes to an attenuation stage Att1. As before, various options for attenuating the waveform magnitude are possible. As a preferred example, the attenuation may be by straight multiplication and set at about times 0.02.

The processed signal waveform from Att1 then passes to a summing-junction, at which it is added to the signal waveform store PCE, which is the cumulative error waveform of previous cycles. The two sampled waveforms are summed, passed through a further clipping stage Clip2, preferably set at about 20 A, and returned into the store PCE, ready to be used as the total cumulative error waveform in the next cycle.

The stored waveform PCE is read out in the next cycle, but read out advanced in time by a selected amount, as represented by the block Adv1. This processed total error waveform is subtracted from the waveform read out from the required waveform store RW, the difference representing the demand waveform. At the same summing stage, a drive-signal waveform for third-harmonic injection, 3HI is added. In contrast to the voltage-drive of FIG. 2, this is done only for the neutral line. As before, the third-harmonic injection signal waveform, 3HI, is a voltage waveform. The voltages on the lines OA, OB, OC, relative to the neutral, are set by the voltages of the connected load, the terminal voltage characteristic of the inverter being 'soft' as noted earlier. Therefore, these lines follow the third-harmonic voltage of the neutral, so that third-harmonic injection is automatically applied to all four lines.

The output of the summing-junction passes through a digital-to-analog converter DAC1 and then to another phase-compensator PC2. The output of PC2 is the analog drive signal representing the total revised demand waveform, including third-harmonic injection, for the next cycle, which is input to BBHCC.

As mentioned previously, in addition to the cyclic feedback system described above, an active damping arrangement is provided in each of the output lines to further improve the stability and output waveform quality of the power conditioning unit. The active damping arrangement for lines A,B,C of FIG. 4 is shown in more detail in FIG. 5. As before, the output filter for only one line is shown.

Figure 5:
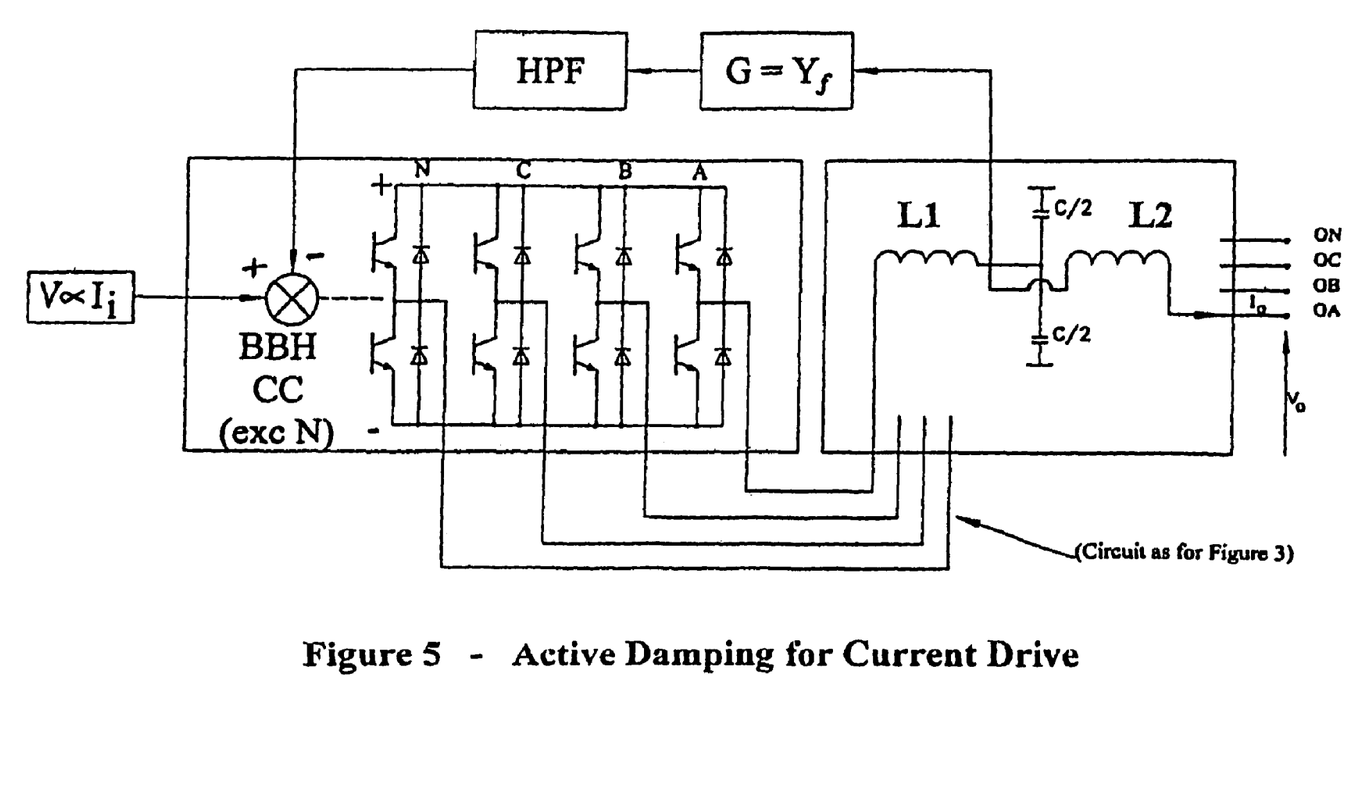
FIG. 5 is a block diagram of an active damping arrangement for the drive of FIG. 4.

FIG. 5 shows an active damping arrangement for a current-drive having a sensor that is provided for sensing voltage across the capacitor C. The sensed voltage is adjusted in magnitude, equivalent to multiplying it by a coefficient G, to provide a damping signal. The value of G may vary within a range to suit particular applications as previously described. In the specific example shown in FIG. 5 the coefficient is set to 0.7 inverse-ohms. Once through the multiplication stage, the resultant signal is passed through a high-pass filter HPF. This is preferably a simple second-order filter with corner frequency set at 300 Hz. After the high-pass filter, the signal is then fed back to a summing-junction at an input of the inverter, this summing-junction being between PC2 and the input to the bang-bang control stage of BBHCC (not shown in detail). In this way, the output of the combined inverter/converter and output filter is actively damped.

The chosen value of G gives a degree of damping of the L2tot-C resonance that is substantial though less than critical, depending on the characteristics of the external load and the effective value of L2tot taking account of the contribution from the load inductance. With the embodiment shown values of L2tot up to about 200 micro-H are acceptable. It should be noted that the phase-frequency characteristic of the actively damped filter is further influenced by the high-pass filter HPF.

It is found by modelling and measurement that this degree of active damping yields a phase-frequency characteristic for the filter which, in combination with all other contributory sources of phase-frequency effect around the loop, yields a total characteristic that has acceptably low deviation from linearity. As for the voltage-drive, this deviation may be sufficiently low as to make it possible to omit the phase-compensators PC1 or PC2 from the cyclic feedback loop. However, stability can only be maintained over a substantial range of load conditions with a small value of the attenuation coefficient Att1, such as to cause the settling time to occupy a considerable number of cycles. This is, however, acceptable for typical current-drive applications.

Both FIGS. 2 and 4 depict drives in which the signal processing is sufficient to provide an acceptable level of harmonic distortion, stability, and robustness, suitable for many applications. In both cases, the active damping serves a dual purpose, as described earlier. It improves the phase-frequency characteristic of the cyclic feedback loop, and it reduces the harmonic distortion at the output terminals of the power conditioning unit in the absence of cyclic feedback, thus making the task of the cyclic feedback easier and so further improving the performance of the generator.

It will be clear that in both FIG. 2 and FIG. 4, the signal path that is the main feedback loop for cyclic feedback control is essentially the same. The complete loop runs from a point following the point at which the output waveform is sensed, 101, to a point at which the required waveform signal is subtracted to yield an error signal, 102. From there, the loop runs to a point at which that error signal, after processing, is added to the cumulative error signal from previous cycles of cyclic feedback action, 103. After processing the signal is put back into the store of processed cumulative error waveform to update that waveform by one cycle, 104. The processed cumulative error waveform is then fed out, 105, time-advanced, and subtracted from the required error waveform at the summing-junction, 106. At this point a third-harmonic injection waveform may be added, the output of the summing-junction then being further signal-processed and made available as an input, point 107. Alternatively, the third-harmonic injection signal may be added after the further signal-processing, immediately prior to point 107, if that arrangement results in significantly less unwanted phase-shifting of the third-harmonic signal relative to the required waveform; this alternative is not shown in the Figures. The input 107 is to the sub-component of the system that comprises the inverter or converter and the output filter. The output from that sub-component is sensed, and the sensed signal closes the loop back to point 101.

Power conditioning units essentially similar to those described with reference to FIGS. 2 and 4 have a three-phase output (with or without a fourth neutral line), and may have a power rating in a range from a few kW to a few MW. However, the method of control is equally applicable to single-phase supply or to supply with any other phase-number and to power ratings above and below the stated range.

Whilst the units of FIGS. 2 and 4 show neutral lines, it is possible in principle that a neutral line is not required, although this may require some modification to signal processing procedures. Alternatively, the neutral line may be a passive connection to an appropriate point in the power conditioning unit. As described, it is possible for the amplitude of the AC waveform to be zero at an output line of the power conditioning unit, as may be the case with an active neutral line, or the AC waveform may contain only third-harmonic frequency, and the method in which the invention is embodied may still be applicable to the line.

The cyclic feedback loops of FIGS. 2 and 4 work to reduce unwanted harmonics in the output waveform, for all harmonics whose frequencies are integral multiples of the basic AC operating frequency, so that the distortion produced by the harmonics remains in constant phase relation to the AC cycle in successive cycles of operation. It is well known that such harmonics, of substantial size, are generated and/or modified both by internal effects within the power conditioning unit and by external effects due to the applied load.

Distortion of the AC waveform by the occurrence of a DC component is also reduced by the feedback.

It should be noted that the period of the AC cycle is not constrained to be constant and may vary in accordance with the variation of output frequency, for example as the output follows the frequency of a power distribution network to which the power conditioning unit is connected. It may be assumed however that significant change in the period occurs only over a time that is long in comparison with one period, in which case no difficulties of principle are caused for the working of the invention. However, means must be provided to sense with sufficient accuracy the period of the AC cycle at any particular time.

The embodiments above are described by way of example and are only to be considered preferred and illustrative of the inventive concepts disclosed. The scope of the invention is not to be restricted to the embodiments. Various and numerous other arrangements may be devised by one skilled in the art without departing from the spirit and scope of this invention.

The invention claimed is:

1. An active damping arrangement for a power conditioning circuit comprising a converter or an inverter and an electronically driven output line having an output terminal for connecting to an external load, the active damping arrangement comprising:
   an inductor-capacitor low-pass output filter for connecting between an output of the inverter/converter and the output terminal,
   means for sensing current in or voltage across the capacitor or voltage between one end of the capacitor and an effective neutral point,
   means for multiplying the sensed voltage or current by a coefficient G to provide a damping signal, and
   means for feeding back the damping signal to an input of the inverter/converter, thereby to damp the output of the inverter/converter.

2. An active damping arrangement as claimed in claim 1, wherein the capacitor C is connected in such a manner as to have a return path to a neutral point or to a rail of a DC supply.

3. An active damping arrangement as claimed in claim 1, wherein the capacitor of C is split so as to have a plurality of return paths distributed among two or more neutral points and/or among two or more DC rails.

4. An active damping arrangement as claimed in any one of the preceding claims, adapted for use with a power conditioning circuit that has a plurality of output lines.

5. An active damping arrangement as claimed in claim 4, wherein an inductor-capacitor low-pass output filter is provided for each line, the means for sensing is operable to sense separately the current/voltage in each line, the means for multiplying is operable to act on the sensed voltage or current in each line to provide a separate damping signal for each line and the means for feeding back the damping signal is operable to feed back each signal to an input point for the relevant output line.

6. An active damping arrangement as claimed in either of claim 4 or claim 5, wherein some or all of the capacitance of the capacitor is connected between the output lines.

7. An active damping arrangement as claimed in any one of the preceding claims, wherein the inverter/converter is of a voltage-drive form and the signal sensed by the sensor is current.

8. An active damping arrangement as in any one of claims 1 to 6, in which the inverter/converter is of current-drive form and the signal sensed by the sensor is voltage.

9. A active damping arrangement as claimed in any one of the preceding claims comprising means for applying a demand input waveform at an input of the circuit for power conditioning, a cyclic feedback loop between the input and output, the feedback loop including: means for sampling the output waveform, means for subtracting the sampled output waveform from a pre-determined required waveform to produce an error waveform, means for processing the error waveform in a pre-defined manner to produce a processed error waveform, means for adding or subtracting the processed error waveform from the demand waveform to produce a revised demand waveform, and means for applying the revised demand waveform to the input at a subsequent time as an input demand waveform to produce a new AC output waveform at the output.

10. An arrangement as claimed in claim 9 comprising means for summing previous processed error waveforms, means for processing the sum of previous processed error waveforms to produce a processed cumulative sum of processed error waveforms, and means for adding the processed error waveform to the processed cumulative sum of processed error waveforms to produce a new cumulative sum of processed error waveforms, wherein the means for subtracting are operable to subtract the new cumulative sum of processed error waveforms from the required waveform instead of subtracting the processed error waveform from the demand waveform to produce the revised demand waveform.

11. A power conditioning unit with or without a neutral line including an active damping arrangement as claimed in any one of claims 1 to 10.

12. A method of active damping for a power conditioning circuit comprising a converter or an inverter and an electronically driven output line having an output terminal for connecting to an external load, the active damping method comprising:
    sensing current in or voltage across a capacitor or voltage between one end of the capacitor and an effective neutral point, the capacitor being an inductor-capacitor low-pass output filter for connecting between an output of the inverter/converter and the output terminal,
    multiplying the sensed voltage or current by a coefficient G to provide a damping signal, and
    feeding back the damping signal to an input of the inverter/converter, thereby to damp the output of the inverter/converter.

13. A method as claimed in claim 12, wherein the capacitor C is connected in such a manner as to have a return path to a neutral point or to a rail of a DC supply.

14. A method as claimed in claim 12 or 13, wherein the inverter/converter is of a voltage-drive form and the signal sensed by the sensor is current.

15. A method as claimed in claim 12 or 13, in which the inverter/converter is of current-drive form and the signal sensed by the sensor is voltage.

16. A micro-turbine-generator comprising a gas turbine mechanically coupled to a permanent-magnet alternator, the output of the alternator being electrically connected to a power conditioning unit as claimed in claim 11.

* * * * *

UNITED STATES PATENT AND TRADEMARK OFFICE
CERTIFICATE OF CORRECTION

| | |
|---|---|
| PATENT NO. | : 7,035,124 B2 |
| APPLICATION NO. | : 10/433879 |
| DATED | : April 25, 2006 |
| INVENTOR(S) | : David Chadwick et al. |

It is certified that error appears in the above-identified patent and that said Letters Patent is hereby corrected as shown below:

Column 18:
Claim 2

Line 51
"An" should be --The--.
"as claimed in" should be --according to--.

Claim 3

Line 55
"An" should be --The--.
"as claimed in" should be --according to--.

Claim 4

Line 59
"An" should be --The--.

Lines 59-60
"as claimed in any one of the preceding claims," should be --according to claim 1, wherein the active damping arrangement is--.

Claim 5

Line 62
"An" should be --The--.
"as claimed in" should be --according to--.

Column 19:
Claim 6

Line 4
"An" should be --The--.

Lines 4-5
"as claimed in either of" should be --according to--.

UNITED STATES PATENT AND TRADEMARK OFFICE
CERTIFICATE OF CORRECTION

| | |
|---|---|
| PATENT NO. | : 7,035,124 B2 |
| APPLICATION NO. | : 10/433879 |
| DATED | : April 25, 2006 |
| INVENTOR(S) | : David Chadwick et al. |

Page 2 of 4

It is certified that error appears in the above-identified patent and that said Letters Patent is hereby corrected as shown below:

Column 19 (Cont'd):
Claim 6

Line 5
Delete "or claim 5".

Claim 7

Line 7
"An" should be --The--.

Lines 7-8
"as claimed in any one of the preceding claims," should be --according to claim 1,--.

Claim 8

Line 11
"An" should be --The--.

Lines 11-12
"as in any one of claims 1 to 6, in which" should be --according to claim 1, wherein--.

Claim 9

Line 14
"A" should be --The--.

Lines 14-15
"as claimed in any one of the preceding claims" should be --according to claim 1 further--.

Claim 10

Line 29
"An" should be --The active damping--.
"as claimed in" should be --according to--.
After "9" insert --further--.

UNITED STATES PATENT AND TRADEMARK OFFICE
CERTIFICATE OF CORRECTION

PATENT NO.       : 7,035,124 B2
APPLICATION NO.  : 10/433879
DATED            : April 25, 2006
INVENTOR(S)      : David Chadwick et al.

It is certified that error appears in the above-identified patent and that said Letters Patent is hereby corrected as shown below:

Column 20:
Claim 11

Line 5
"A" should be --The active damping arrangement according to claim 1, wherein the--.
"with or without" should be --has--.

Lines 6-7
Delete "including an active damping arrangement as claimed in any one of claims 1 to 10".

Claim 13

Line 23
"A" should be --The--.
"as claimed in" should be --according to--.

Claim 14

Line 26
"A" should be --The--.
"as claimed in claims 12 or 13" should be --according to claim 12--.

Claim 15

Line 29
"A" should be --The--.
"as claimed in claims 12 or 13" should be --according to claim 12--.

Claim 16

Line 32
After "comprising:" insert --:--.
After "a gas turbine" insert --;--.

UNITED STATES PATENT AND TRADEMARK OFFICE
CERTIFICATE OF CORRECTION

PATENT NO. : 7,035,124 B2
APPLICATION NO. : 10/433879
DATED : April 25, 2006
INVENTOR(S) : David Chadwick et al.

It is certified that error appears in the above-identified patent and that said Letters Patent is hereby corrected as shown below:

Column 20 (Cont'd):
Claim 16

Line 33
Delete "mechanically coupled to".
After "alternator" delete "," and insert --mechanically coupled to the gas turbine, the alternator having an output; and--.
Before "the" insert --a power conditioning unit electrically coupled to--.

Line 34
After "alternator" insert --;-- and delete "being electrically connected to a power conditioning unit as claimed in claim 11" and insert
--the power conditioning unit comprising an active conditioning arrangement comprising:
    an inductor-capacitor low-pass output filter for connecting between an output of the inverter/converter and the output terminal;
    means for sensing current in or voltage across the capacitor or voltage between one end of the capacitor and an effective neutral point;
    means for multiplying the sensed voltage or current by a coefficient G to provide a damping signal; and
    means for feeding back the damping signal to an input of the inverter/converter, thereby to damp the output of the inverter/converter.--

Signed and Sealed this

Fourth Day of March, 2008

JON W. DUDAS
*Director of the United States Patent and Trademark Office*